(12) United States Patent
Kim et al.

(10) Patent No.: US 8,065,550 B2
(45) Date of Patent: Nov. 22, 2011

(54) DIGITAL DELAY LOCKED LOOP CIRCUIT USING MODE REGISTER SET

(75) Inventors: Bo-Kyeom Kim, Kyoungki-do (KR); Sang-Sik Yoon, Kyoungki-do (KR)

(73) Assignee: Hynix Semiconductor, Inc. (KR)

( * ) Notice: Subject to any disclaimer, the term of this patent is extended or adjusted under 35 U.S.C. 154(b) by 995 days.

(21) Appl. No.: 12/005,917

(22) Filed: Dec. 28, 2007

(65) Prior Publication Data

US 2009/0119533 A1 May 7, 2009

(30) Foreign Application Priority Data

Nov. 2, 2007 (KR) .................. 10-2007-0111613

(51) Int. Cl.
*G06F 1/04* (2006.01)
(52) U.S. Cl. ........................................ 713/401; 713/503
(58) Field of Classification Search .................. 713/400, 713/401, 503
See application file for complete search history.

(56) References Cited

U.S. PATENT DOCUMENTS

| 2005/0035799 A1* | 2/2005 | Mikhalev et al. ............. 327/158 |
| 2005/0128828 A1* | 6/2005 | Lee ................................ 365/194 |
| 2007/0008791 A1* | 1/2007 | Butt et al. ..................... 365/193 |

FOREIGN PATENT DOCUMENTS

| KR | 10-1997-0077998 | 12/1997 |
| KR | 10-0728971 | 6/2007 |

* cited by examiner

*Primary Examiner* — Dennis M Butler
(74) *Attorney, Agent, or Firm* — Blakely, Sokoloff, Taylor & Zafman

(57) ABSTRACT

A semiconductor memory device includes a mode register set for establishing information on a delay time, a delay time calculator for calculating an I/O path delay time of a data clock on a basis of a unit period of a system clock, and a delay locked clock generator for reflecting in the data clock a value of subtracting an output of the delay time calculator from the information established in the mode register set.

15 Claims, 4 Drawing Sheets

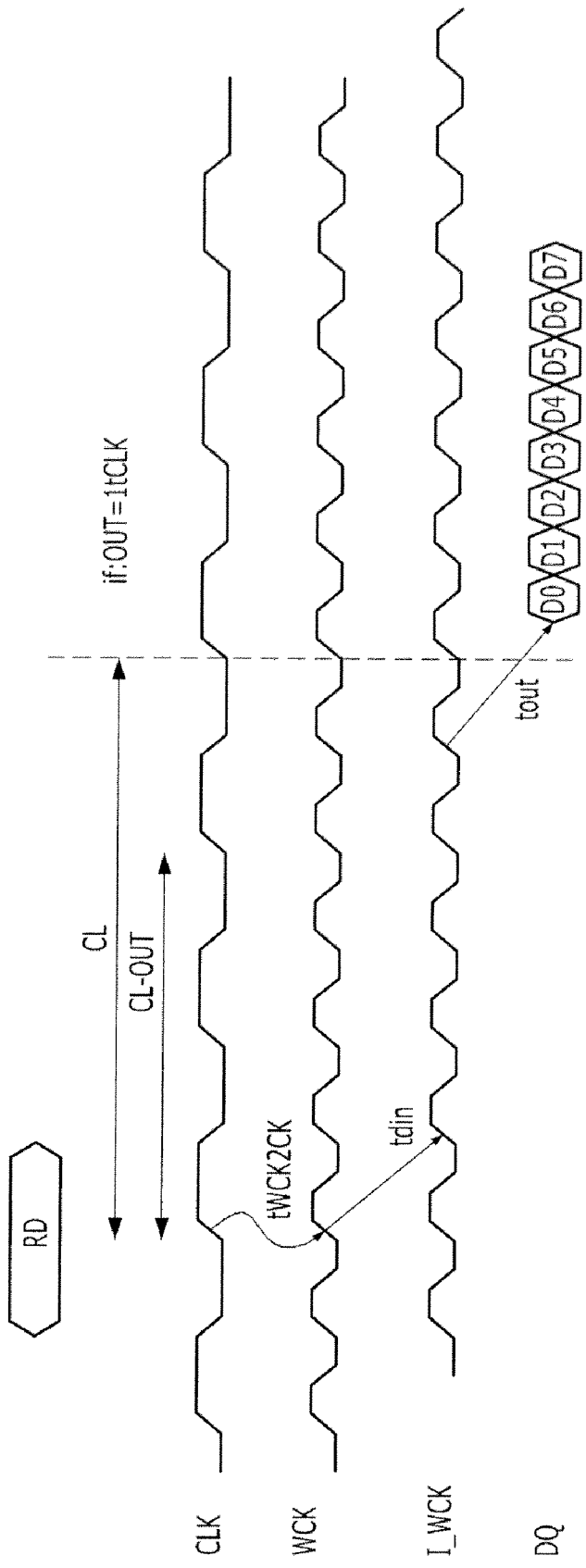

DIGITAL DELAY LOCKED LOOP CIRCUIT USING MODE REGISTER SET

CROSS-REFERENCES TO RELATED APPLICATION

The present application claims priority to Korean application number 10-2007-0111613, filed on Nov. 2, 2007, which is incorporated by reference in its entirety.

BACKGROUND OF THE INVENTION

The present invention relates to a semiconductor memory device and, more particularly, to a delay locked loop circuit for controlling an internal operation of a semiconductor memory device in order that data are outputted in synchronization with a system clock based on an external command.

In a system including a plurality of semiconductor devices, the semiconductor memory device stores data. When a data processing unit, i.e., a CPU, requires data, the semiconductor memory device outputs data corresponding to an address inputted from the data processing unit or stores data provided from the data processing unit in a cell position corresponding to the address.

With the increase in the operating speed of a system having semiconductor devices and the development of semiconductor integrated crictui technology, the semiconductor memory device is required to output or store data faster than before. In order to input/output data at high speed, a synchronous memory device, which is capable of inputting/outputting data in synchronization with a system clock inputted from the external circuit, has been developed. However, since the synchronous memory device did not sufficiently satisfy the required speed of inputting/outputting data, a DDR (Double Data Rate) synchronous memory device, which is capable of inputting/outputting data at a rising edge and a falling edge of a system clock, respectively, has been developed.

Since the DDR synchronous memory device should input/output data at the rising edge and the falling edge of the system clock, respectively, it should process two data within one time period of the system clock. That is, the DDR synchronous memory device should output data or receive and store data at the rising edge and the falling edge of the system clock, respectively. Particularly, a timing at which the DDR synchronous memory device outputs data should accurately synchronize with the rising edge or the falling edge of the system clock. Thus, a data output circuit within the DDR synchronous memory device is used to control an internal output and a transfer timing of data so that the data are outputted in synchronization with the rising edge and the falling edge of the inputted system clock.

However, the system clock inputted to the semiconductor memory device is inevitably delayed by a clock input buffer disposed in the semiconductor memory device and a transmission line for transferring a clock to the data output circuit. Thus, if the data output circuit outputs data in synchronization with the system clock which is transmitted with a delay time, an external apparatus receives output data which are not in synchronization with the rising edge and the falling edge of the system clock.

In order to solve such a problem, the semiconductor memory device includes a delay locked loop circuit for compensating for the delay of the clock and fixing the phase of an internal clock. The delay locked loop circuit compensates for a value of the delay caused by an internal circuit within the semiconductor memory device until the system clock is inputted to the semiconductor memory device to be transferred to the data output circuit. The delay locked loop circuit finds out a time at which the system clock is delayed by the clock input buffer within the semiconductor memory device and the transmission line for transferring the clock, and delays the system clock corresponding to the found value to output the system clock to the data output circuit. That is, through the delay locked loop circuit, the system clock inputted to the semiconductor memory device is transferred to the data output circuit as the internal clock having the fixed delay value. When the data output circuit outputs data in synchronization with the system clock having the fixed delay value, it is determined by the external circuit that the data are accurately in synchronization with the system clock to be outputted.

Actually, a delay locked clock outputted from the delay locked loop circuit is transferred to an output buffer at a timing which precedes a data output timing by one time period, and the data are in synchronization with the transferred delay locked clock to be outputted. Thus, the system clock outputs the data quickly as much as it is delayed by the internal circuit within the semiconductor memory device. Therefore, it is determined by the external circuit of the semiconductor memory device that the data are accurately in synchronization with the rising edge and the falling edge of the system clock inputted to the semiconductor memory device and outputted. Accordingly, the delay locked loop circuit finds out how quickly the data should be outputted to compensate for the delay value of the system clock within the semiconductor memory device.

The conventional delay locked loop circuit compares the phase of the system clock with that of the internal clock reflecting the delay value and controls the phases through a delay line which includes unit delay cells having a constant delay time that is as much as the sensed phase difference. However, it is difficult to use the conventional delay locked loop circuit in a semiconductor memory device which operates at a high-frequency.

Recently, since the semiconductor memory device is required to operate at a high speed, the frequency of the system clock inputted to the semiconductor memory device becomes high. Also, a semiconductor memory device in which the number of the data outputted for one time period of the system clock is increased from two to four, has been newly suggested. The semiconductor memory device operating at high speed uses, as a reference for inputting/outputting data, a separate data clock which has a frequency twice as high as that of the system clock. For example, if the frequency of the system clock, which is a reference for inputting/outputting a command and an address, is 1 GHz, the frequency of the data clock is 2 GHz. In order for the semiconductor memory device to operate in response to such a high-frequency clock, the conventional delay locked loop circuit, which compensates for the delay value of the system clock to control the timing at which the data are outputted from the inside to the external circuit, should minutely and accurately control the change in the delay value that is used to control phase locking, as the clock frequency becomes high.

The conventional delay locked loop circuit detects a phase difference between an inputted clock and a reference clock, controls a delay element to reduce the phase difference, delays the clock by delay model which is occurred during the process of inputting/outputting the clock, and performs a feedback operation of the delayed clock. In each of the above mentioned processes of the delay locked loop circuit using a negative delay effect, a delay value change or a clock distortion can occur because of the change in surrounding environments, such as a voltage level, a temperature, a pressure and a process in the semiconductor memory device. As the frequencies of the inputted clock and the reference clock become high, the distortion, error and delay value change in each process should be considered as important factors in a time domain, and the phase locking based on the distortion, error and delay value change becomes more difficult. Accordingly, the conventional analogue method, which removes the phase difference by continuously tracking the phase of the clock through the control of the delay value between the inputted clock and the reference clock, should be improved.

SUMMARY OF THE INVENTION

The present invention is directed to providing a semiconductor memory device including a delay locked loop circuit which is capable of controlling a timing at which data corresponding to a read command are inputted/outputted in an environment using a high-frequency system clock.

Instead of using a conventional analogue method, which removes a phase difference by continuously tracking a clock through the control of a delay value for a phase locked signal between an inputted clock and a reference clock, the present invention generates a phase locked clock for determining the timing at which the data corresponding to the read command are outputted through an internal operation, by considering a CAS latency (CL) value that has beenset in a mode register set (MRS), together with a clock I/O delay time. Also, in case that the semiconductor memory device receives an error detection command for a write operation, the present invention can find out, in the same way, the timing at which data corresponding to a write command has reached an internal circuit, by using a stored write latency (WL) value, instead of the CAS latency. If an error detection operation through an error detection code (EDC) and a cyclical redundancy check (CRC) on extra information is adopted in the high-speed semiconductor memory device, the latency time to be set in the mode register set, which is corrected according to the error detection operation, is used. Therefore, in the semiconductor memory device to which a high-frequency clock is inputted, the phase difference in the clocks can be overcome and the timing at which data are inputted/outputted can be accurately controlled.

The semiconductor memory device of the present invention can overcome a clock distortion and a phase error which occur according to an operational environment, using a technique that is different from the conventional method of sensing the phase difference between the high-frequency clock signals and controlling the delay value for overcoming the phase difference and tracking it for the phase locked signal.

Also, the present invention reflects the delay value through a replica circuit on a value established in the mode register set in the semiconductor memory device and calculates a compensation value for overcoming the phase difference to reduce the phase error which occurs according to the operational environment so that data can be inputted/outputted at a predetermined delay timing.

Further, since a phase locked circuit for compensating a data I/O timing can be simply configured in the present invention, the integration of the semiconductor memory device is improved and its current consumption is also reduced.

BRIEF DESCRIPTION OF THE DRAWINGS

The above and other aspects, features and other advantages of the subject matter of the present disclosure will be more clearly understood from the following detailed description taken in conjunction with the accompanying drawings, in which:

FIG. 4 is a waveform diagram showing a read operation in accordance with the operation of the invented semiconductor emory device.

DESCRIPTION OF SPECIFIC EMBODIMENTS

Hereinafter, the present invention will be described in detail through embodiments. The embodiments are just for exemplifying the present invention, and the scope of right to be protected of the present invention is not limited by them.

Figure 1:
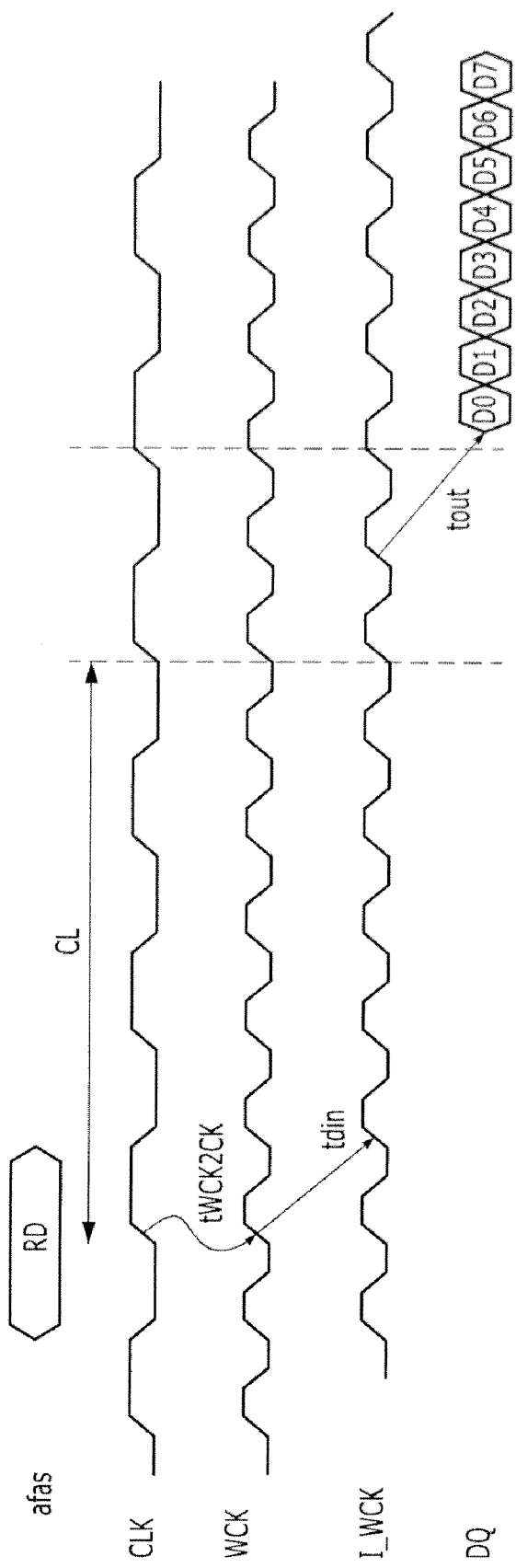
FIG. 1 is a wave form diagram showing a problem of a read operation of a conventional semiconductor memory device.

FIG. 1 is a wave form diagram showing a problem of a read operation of a conventional semiconductor memory device.

As shown in FIG. 1, the semiconductor memory device outputs data corresponding to a read command RD to an external circuit with the lapse of a predetermined time after the read command RD is inputted in synchronization with a system clock CLK. At a read operation in the semiconductor memory device, an address inputted along with the read command RD is decoded to generate an internal address and an internal command which are necessary to drive data in a unit cell corresponding to the address. Then, the semiconductor memory device senses and amplifies the data stored in the unit cell using the internal address and the internal command, transfers the data to an I/O pad through a data I/O line and transfers the data to the external circuit through a pin. Such a read operation is performed through several internal operations which require processing time. Representatively, a CAS latency CL shown in FIG. 1 is defined in the specification of the semiconductor memory device.

The CAS latency CL refers to an omission time of a column address strobe (CAS) signal which is transferred to inform a column address that is necessary for data processing in the semiconductor memory device. In detail, since columns and rows are arranged in a lattice in a plurality of unit cells of the semiconductor memory device, a row address strobe (RAS) signal is used to confirm a row address and the column address strobe (CAS) signal is used to confirm the column address. Thus, the CAS latency CL is taken as a duration for which data are sensed and amplified in the unit cell through a row access and a column access and transferred to the external circuit after the read command RD is applied to the semiconductor memory device.

As shown in FIG. 1, the semiconductor memory device, which is required to operate at high speed, is designed to use two reference clocks CLK and WCK to output four data in one time period of the system clock CLK. Here, the system clock CLK is a reference for inputting/outputting a command and an address and the data clock WCK is a reference for inputting/outputting data. The period of the data clock WCK is a half of the period of the system clock CLK.

When the CAS latency CL passes, the data, which are transferred and outputted to the data pad through the data I/O line in response to the read command RD, are finally outputted to the external circuit through a plurality of pins. As shown in FIG. 1, an input delay time tdin and an output delay time tout, which are caused on an I/O path of the system clock CLK, occur when the data D0 to D7 corresponding to the read command RD are outputted. Here, the input delay time tdin is taken as a duration for which the data clock WCK applied from the external circuit is delayed to be used in each data pad. Generally, a delay time of an input buffer of the data clock WCK, a delay time of a phase locked loop (PLL) and a time at which the data clock WCK is transferred to each data pad through an internal clock path are included in the input delay time tdin. Also, the output delay time tout is taken by a duration for which the data corresponding to the read command RD are transferred to a data output driver and then to the external circuit through the plurality of the pins.

Further, before the semiconductor memory device performs a read or write operation, the semiconductor memory device aligns the phases of the data clock WCK with the system clock CLK through clock training to guarantee the operational reliability of the semiconductor memory device although the command and data are inputted/outputted through the two different reference clocks.

Since the semiconductor memory device additionally requires a phase alignment delay time tWCK2CK, the input delay time tdin and the output delay time tout, besides a time at which the internal operation corresponding to the read command RD is actually performed, in order to output the data D0 to D7 corresponding to the read command RD at a desirable timing, an apparatus for time compensation is needed. Referring to FIG. 1, if the sum of the phase alignment delay time tWCK2CK, the input delay time tdin and the output delay time tout is bigger than one time period (tCK) of the system clock CLK, a data processing unit, which transfers the read command RD, receives the data D0 to D7 corresponding to the read command RD with the lapse of more than one time period of the system clock CLK (after the CAS delay time CL elapses after the read command RD is applied to the semiconductor memory device.) That is, as shown in FIG. 1, the data D0 to D7 corresponding to the read command RD are outputted at a timing which is more delayed than the CAS latency CL so that the operational reliability of the semiconductor memory device falls. In order to solve such a problem, the semiconductor memory device according to one embodiment of the present invention controls a transfer timing of data according to internal operations which are performed in response to the read command RD so that the transfer timing of data is not later than the CAS latency CL.

Figure 2:
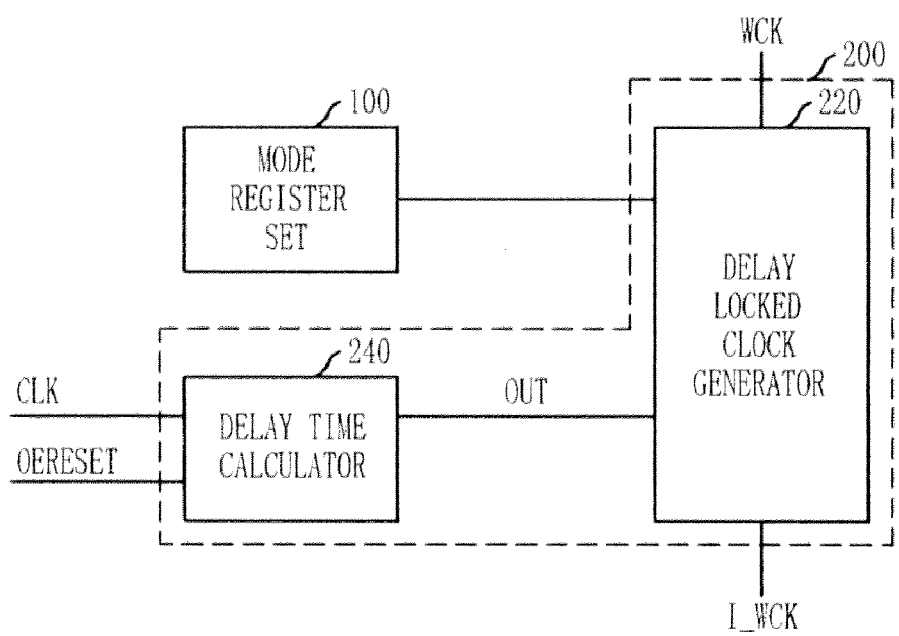
FIG. 2 is a block diagram illustrating the semiconductor memory device according to one embodiment of the present invention.

FIG. 2 is a block diagram illustrating the semiconductor memory device according to one embodiment of the present invention.

As shown in FIG. 2, the semiconductor memory device includes a mode register set 100 for establishing information on delay times and a phase locked circuit 200 for compensating for a delay time which occurs on an I/O path of a data clock WCK. The phase locked circuit 200 includes a delay time calculator 240 for calculating the delay time of an I/O path of the data clock WCK on a basis of a unit period tCK of a system clock CLK (and outputting the calculated delay time,) and a delay locked clock generator 220 for outputting an internal data clock I_WCK which reflects a value of subtracting an output of the delay time calculator 240 from the information established in the mode register set 100 in the data clock WCK.

If a read command RD is inputted in synchronization with the system clock CLK, the delay locked clock generator 220 receives a CAS latency CL established in the mode register set 100 to change the phase of the data clock WCK. This is applied according to a result of subtracting the output of the delay time calculator 240 from the information established in the mode register set 100. On the other hand, if a write command is inputted in synchronization with the system clock CLK, the delay locked clock generator 220 receives a write latency (WL) established in the mode register set 100, and subtracts the output of the delay time calculator 240 from the information established in the mode register set 100 in the data clock WCK. Thus, if the read command RD is applied to the semiconductor memory device, the semiconductor memory device can output data with the lapse of the CAS latency CL from the activation of the read command RD, and if the write command is applied to the semiconductor memory device, the semiconductor memory device can output write data, which are applied with the lapse of the write latency WL from the application of the write command, at a desirable timing. A detailed configuration of the delay locked clock generator 220 will not be described because the delay locked clock generator 220 can be constituted through the application of various kinds of subtracters which are well-known to a person skilled in the art.

Figure 3:
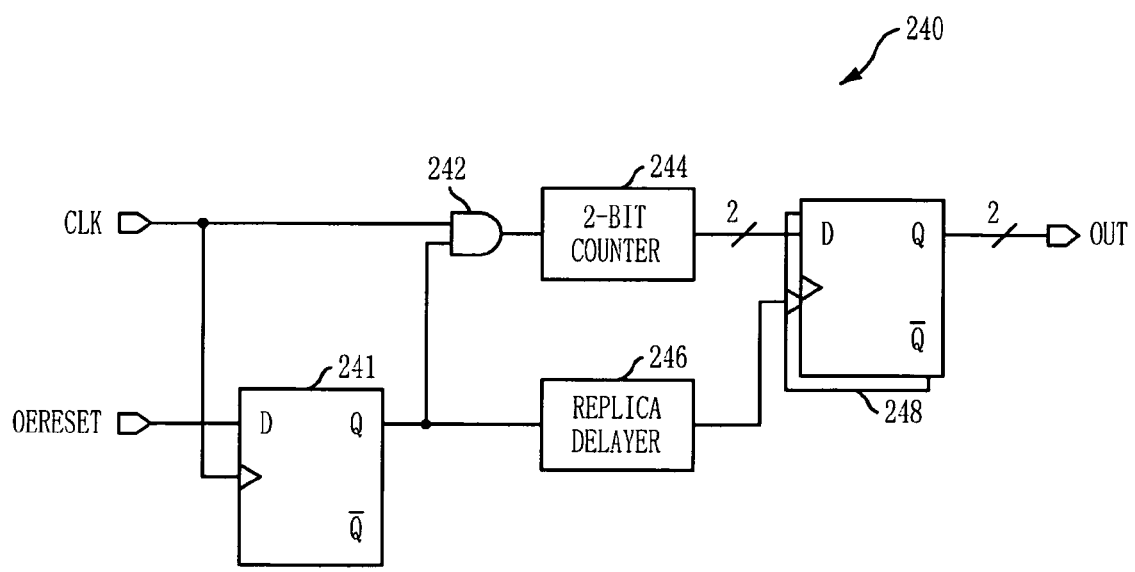
FIG. 3 is a block diagram illustrating a delay time calculator of FIG. 2.

FIG. 3 is a block diagram illustrating the delay time calculator 240 of FIG. 2.

As shown in FIG. 3, the delay time calculator 240 includes a first flip-flop 241 for synchronizing with the system clock CLK to sense an output enable reset signal OERESET, an AND gate 242 for performing an AND operation of the system clock CLK and an output of the first flip-flop 241, a counter 244 for counting an output of the AND gate 242, a replica delayer 246 for delaying the output of the first flip-flop 241 as much as an I/O path delay time of the data clock WCK and an output unit 248 for sensing an output of the counter 244 in synchronization with an output of the replica delayer 246 to output a calculated value OUT. Here, if the counter 244 has N bits (N is a natural number), the output unit 248 includes N flip-flops. Since the sum of the input delay time tdin and the output delay time tout of the data clock WCK is generally not big, a 2-bit counter is illustrated in FIG. 3.

In detail, after the output enable reset signal OERESET, which is activated by a command applied from the external circuit, is sensed in synchronization with the system clock CLK, the output enable reset signal OERESET is delayed in the replica delayer 246 and the counter 244 counts the system clock CLK which is continuously inputted while the output enable reset signal OERESET is delayed. Here, since the replica delayer 246 replicates the path of the data clock WCK which generates the input delay time tdin and the output delay time tout in the semiconductor memory device, a signal outputted from the first flip-flop 241 is delayed as much as the input delay time tdin and the output delay time tout. Then, a clock terminal of each of a plurality of flip-flops included in the output unit 248 receives the output of the replica delayer 246, and an input terminal of each of the plurality of the flip-flops receives the output of the counter 244. Thus, the output unit 248 divides the sum of the input delay time tdin and the output delay time tout based on the unit period tCK of the system clock CLK, thereby outputting a division result which is rounded up to the nearest integer. That is, the value outputted from the output unit 248 can be defined as OUT= (tdin+tout)/tCK.

Since the delay locked clock generator 220 can confirm a time for performing the internal operations to receive the output of the delay time calculator 240 and subtract it from the CAS latency CL established in the mode register set 100 to output the data corresponding to the read command RD, the data processing unit can receive the data outputted from the semiconductor memory device at a predetermined timing.

The semiconductor memory device, which inputs/outputs data in a high speed, can perform an error detection operation through an error detection code (EDC) and a cyclical redundancy check (CRC) in order to guarantee a high-speed data transmission. Since the error detection operation requires a separate time during the read or write operation, if the error detection operation is performed, the delay time information regarding the read or write operation can be different. Thus, the semiconductor memory device according to the present invention can reflect the delay time information which reflects the time required for the error detection operation in the mode register set. For example, in a GDDR5 (Graphics Double Data Rate version 5) semiconductor memory device, at a write operation, a write CRC latency (WCL) is used when data are transmitted to a graphics data processing unit through an EDC pin.

While the present invention has been described with respect to the particular embodiments, it will be apparent to those skilled in the art that various changes and modifications may be made without departing from the spirit and scope of the invention as defined in the following claims.

What is claimed is:

1. A semiconductor memory device comprising:
  a mode register set configured to establish a delay time latency value information;
  a delay time calculator configured to calculate an I/O path delay time of a data clock on a basis of a unit period of a system clock, the data clock having a period less than said unit period; and
  a delay locked clock generator configured to i) change a phase of the data clock according to a difference between (1) the calculated I/O a delay time of the data clock and (2) the delay time latency value information established in the mode register set, and ii) output an internal data clock which corresponds to the data clock with a changed phase based on said difference.

2. The semiconductor memory device of claim 1, wherein the delay locked clock generator receives a CAS latency which is established in the mode register set when a read command is inputted.

3. The semiconductor memory device of claim 1, wherein the delay locked clock generator receives a write latency which is established in the mode register set when a write command is inputted.

4. The semiconductor memory device of claim 1, wherein the delay time calculator includes:
  a first flip-flop configured to sense an output enable reset signal in synchronization with the system clock
  an AND gate configured to perform ANDing the system clock and an output of the first flip-flop;
  a counter configured to count an output of the AND gate;
  a replica delayer configured to delay the output of the first flip-flop as much as the I/O path delay time: and
  an output unit configured to sense and output the output of the counter in synchronization with an output of the replica delayer.

5. The semiconductor memory device of claim 4, wherein the output unit includes N flip-flops when the counter has N bits (N is a natural number).

6. A delay locked loop circuit comprising:
  a delay time calculator configured to calculate an I/O path delay time of a data clock based on a unit period of a system clock in response to a read command, the data clock having a period less than said unit period; and
  a clock generator configured to generate a delay locked clock based a difference between the calculated I/O path delay time from the read command and a delay time from a predetermined column address strobe (CAS) latency resulting from the read command.

7. The delay locked loop circuit of claim 6, wherein the delay time calculator includes:
  a first flip-flop configured to sense an output enable reset signal, which is enabled in response to the read command, in synchronization with the system clock;
  an AND gate configured to perform ANDing operation of the system clock and an output of the first flip-flop;
  a counter configured to count an output of the AND gate;
  a replica delayer configured to delay the output of the first flip-flop as much as the I/O path delay time; and
  an output unit configured to sense and output the output of the counter in synchronization with an output of the replica delayer.

8. The delay locked loop circuit of claim 7, wherein the output unit includes N flip-flops when the counter has N bits (N is a natural number).

9. The delay locked loop circuit of claim 6, wherein the system clock is a reference for transferring a command and an address, wherein the data clock is a reference for transferring data, and wherein a phase alignment delay time for aligning phases of the data clock with the system clock is compensated through a training operation.

10. A method for operating a semiconductor memory device, comprising the steps of:
  establishing in a mode register set a delay time latency value information;
  calculating an I/O path delay time of a data clock on a basis of a unit period of a system clock, the data clock having a period less than said unit period; and
  generating a i) change a phase of the data clock according to a difference between (1) the calculated I/O path delay time of the data clock and (2) the delay time latency value information established in the mode register set and ii)output an internal data clock which corresponds to the data clock with a changed phase based on said difference.

11. The method of claim 10, wherein the delay time information established in the mode register set is a CAS latency used when a read command is inputted.

12. The method of claim 10, wherein the delay time information established in the mode register set is a write latency used when a write command is inputted.

13. The method of claim 10, wherein the step of calculating the I/O path delay time of the data clock on the basis of the unit period of the system clock includes:
  sensing an output enable reset signal in synchronization with the system clock;
  performing an AND operation of the system clock and the sensed output;
  counting a result of the AND operation;
  delaying the sensed output as much as the I/O path delay time; and
  sensing and outputting the counted output in synchronization with the delayed output.

14. The method of claim 10, wherein the system clock is a reference for transferring a command and an address, wherein the data clock is a reference for transferring data, and wherein a phase alignment delay time for aligning phases of the data clock with the system clock is compensated through a training operation.

15. The method of claim 10, wherein the information on the delay time regarding a read or write operation is established in the mode register set through an error detection operation when the error detection operation is performed through an error detection code or a cyclical redundancy check.

* * * * *